United States Patent Office 2,983,612
Patented May 9, 1961

2,983,612
PROCESS OF MODIFYING PHOSPHATIDES

Joseph Eichberg, Great Neck, N.Y., assignor to American Lecithin Co., Inc., Long Island City, N.Y., a corporation of Ohio No Drawing. Filed Sept. 14, 1953, Ser. No. 380,110

6 Claims. (Cl. 99—15)

The present invention relates to the modification of phosphatides and it particularly relates to the modification and treatment of commercial lecithin.

It is among the objects of the present invention to provide a novel phosphatide composition and particularly a commercial lecithin composition in which the physical and chemical properties of the phosphatides or lecithin have been so modified that the phosphatides or lecithin have greater stability and are more miscible with water and form more stable, emulsified mixtures.

Another object is to provide a process for making a novel phosphatide or lecithin product in which the phosphatide content has been so modified that it has greater stability in aqueous mixtures and may be more readily utilized in the production and in combination with margarine to reduce or prevent spattering on frying.

A further object is to provide a modified, novel phosphatide or lecithin preparation which may be readily mixed with various types of food products or glyceride oils with less discoloration upon heating, and which will have increased effectiveness as an additive.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found that a phosphatide or lecithin composition may be prepared having enhanced water miscible properties or hydrophilic properties if the commercial phosphatides or lecithin are thoroughly mixed with water and are subjected to the action of a small amount of yeast.

Although it is not too clear as to what changes take place in the phosphatides or lecithin, there apparently is a polar modification which results in the phosphatides or lecithin acquiring superior emulsification properties so that they may be mixed with water and emulsified oils and other materials in said water, with less likelihood of separation or precipitation of the oily materials not normally miscible with water.

In general, the procedure consists of the following steps:

Step 1—mixture of the phosphatides with 1 to 5 times its weight of water.

Step 2—addition of mixture with about 1 to 3% of yeast based upon the weight of the phosphatides.

Step 3—heating at a temperature of about 80 to 130° F. for 1 to 5 hours to cause polar modification.

Step 4—inactivation of the yeast by heating at 140° to 200° F. for 30 minutes to 4 hours.

Step 5—dehydration by water removal.

Although the present invention is particularly directed to commercial phosphatides or commercial lecithin, which are derived from vegetable materials, it is to be understood that it may also be applied to processing of other phosphatides or lecithin mixtures such as purified oil-free phosphatides.

Commercial lecithin usually comes upon the market in the form of a plastic or fluid viscous composition, containing essentially about two-thirds phosphatides and one-third vegetable oil, which may be soybean oil, corn oil or other glyceride oil, depending upon the source. The phosphatides present include lecithin, lipositol, cephalin and there is also present small amounts of carbohydrates, mineral salts and protein materials, which are bound together in a complex and are not readily separable, and a small variable amount of free fatty acid is also usually present.

The phosphatides have both hydrophilic and hydrophobic properties and they are readily subject to charring or undesirable change when subjected to elevated temperatures or to strong mineral acids.

It has been found, surprisingly, that the phosphatides or lecithin may be readily modified, apparently, so as to increase their hydrophilic character and decrease their hydrophobic character and to increase their stability and decrease their tendency toward charring in oil solution, and in general to improve their characteristics, by combining them with yeast, either as active dry yeast or as moisture-containing yeast as when freshly prepared.

This treatment may be carried out not only with commercial lecithin but also with de-oiled phosphatides, peracylated phosphatides, sulfonated or sulfated phosphatides, phosphorylated phosphatides and very conveniently with commercial phosphatide emulsions which are prepared during the refining of soya bean oil and which may contain about 50% of water, 33% of phosphatides and 17% of oil.

In the preferred procedure, about 1 to 3 parts by weight of commercial phosphatides containing 50 to 75% phosphatides, with the addition of water to form an emulsion, may be combined with betwen ½ to 5% of a dry yeast.

The preferred percentage of dry yeast is about 1½ to 3%.

This mixture is then permitted to stand at a temperature of 25° C. up to 50° C. for about 1½ to 10 hours, the longer time being utilized for lower temperatures.

The yeast may then be inactivated at that elevated temperature treatment of over 50° C. and the water may be removed under vacuum or by means of treatment with dilute acids.

The yeast apparently acts upon the lecithin to change its polar structure and to enhance the hydrophilic properties while increasing the stability characteristics.

If desired, together with the yeast there may be added small amounts of ammonium salts, such as ammonium sulfate or ammonium chloride.

The percentage of these ammonium salts should be less than 1% and range from .05 to .5%.

There seems to be a generation and release of gas and the phosphatides have accordingly enhanced stability characteristics when added to glyceride oils, such as corn oil, and are more effective as anti-spattering agents in margarine.

Surprisingly, the phosphatides so treated have enhanced hydrophilic properties and they constitute more effective emulsifiers than untreated lecithin.

The following are typical examples:

Example 1

An emulsion was prepared consisting of 50 gms. soybean phosphatide and 100 gms. of water. Active dry yeast in the amount of 2% based on the weight of soybean phosphatide was added, mixed well, and the mixture was placed in an oven and maintained at a temperatunre of 38° C. After being in the oven for 2.5 hours, a portion of the sample was removed and inactivated by heating to 160° F. The original pH of the emulsion was 5:64 and after the 2.5 hour period in the oven the pH was 6.37. Water was removed under vacuum.

The balance of the sample in the oven was removed after a period of 6 hours and the pH found to be 5.78. The sample was inactivated by heating at 160° F. as above and dried under vacuum.

Example 2

Commercial soybean phosphatides containing a minor proportion of fatty oil as a carrier were emulsified with an equal weight of water and subjected to treatment with 2% of active dried yeast for four hours at 104° F., the amount of the yeast being based on the weight of the phosphatide. The resulting product was then dried under vacuum at a temperature of about 160° F. Refined corn oil containing ½% by weight of this treated phosphatide was much lighter in color on heating to 400° F. than the same corn oil containing ½% of untreated phosphatide.

Example 3

One of the principal uses of commercial vegetable phosphatides, commonly known in the trade as lecithin, is in the production of margarine, particularly to reduce or to prevent spattering on frying. A spatter test was carried out by means of a hot plate on which rested an aluminum block. The block contained a thermometer well and thermometer. On top of the block were placed two 5 cc. beakers six inches apart and placed a glass plate flat on the beakers. The distance between the bottom of the glass condensing plate and the top of the aluminum spatter block was 5.5 cm.

The temperature of the spatter block was raised to 400°, 375° and 350° and level spoonsful of each margarine, made in the laboratory—one with untreated lecithin and the other with yeast—treated lecithin as in Example 2 were dropped on the block at each temperature. Separate glass plates were used to catch the spattered material and each plate was observed qualitatively. At 400°, both margarines spattered quite violently, but the yeast-treated lecithin margarine was decidedly better. At 375°, the spattering was less vigorous and again the yeast lecithin margarine was superior. At 350° mild spattering occurred, the margarine with the yeast-treated lecithin again showing superiority.

Example 4

An emulsion was prepared consisting of 50 grams soybean phosphatide and water in the ratio of 50:100. To the emulsion was added 2% active dry yeast based on the weight of soybean phosphatide and the emulsion well stirred. To the mixture was added 0.05 gram of ammonium sulfate and the sample then held in the oven at a temperature of 85° F. for a period of two hours. During this period the emulsion was stirred at intervals. No visible reaction was noted (absence of gas and volume rise). Previous incubations had been at a temperature of 40° C. (104° F.). The temperature of the oven was then raised to the latter temperature. No visible reaction occurred during the first hour. Shortly after the first hour the reaction became very vigorous, being far more pronounced than in previous reactions. The emulsion was held at 104° F. for a total period of two hours.

The sample was removed from the oven, heated to 145° F., held at this temperature for ten minutes and stirred. The emulsion broke. The separated liquid was decanted and the residue transferred to a fine sieve to remove most of the remaining water. The product was then dried under a vacuum ranging from 27–28 inches.

Example 5

An emulsion was prepared consisting of 50 parts of soybean phosphatides and 100 parts of distilled water. To the emulsion was added 2% of active dry yeast based on the weight of syobean phosphatides and the sample held in the oven for four hours at 40° C. (104° F.). A vigorous reaction took place. The sample was heated to 80° C. and held at this temperature for 30 minutes to inactivate the yeast.

The resulting product was dried under vacuum.

Example 6

To 100 grams of soybean phosphatide was added 200 grams of distilled water and the mixture emulsified. Added 2% active dry yeast based on the weight of soybean phosphatide and 0.10 gram of ammonium sulfate to the total weight of mixture.

The emulsion was held in the oven for two hours at a temperature of 120° F. with frequent stirring. The reaction started sooner than when held at 104° F. but the overall reaction was far less pronounced than at 104° F.

Example 7

To 100 grams of commercial lecithin was added 200 grams of water and the mixture emulsified. Added 2% dry yeast based on the weight of soybean phosphatide and 0.10 gram of ammonium chloride on the total weight of sample.

The reaction started within the first hour after being in the oven at 104° F.; after being in the oven for two hours the reaction was very mild compared to reaction with ammonium sulfate.

Example 8

An emulsion was prepared consisting of 100 grams of soybean phosphatide and 150 grams of water. The emulsion was homogenized and allowed to stand overnight.

To the emulsion was added 4% of compressed baker's yeast based on the weight of soybean phosphatide. The yeast was first mixed thoroughly in a small volume of water.

The sample was held in the oven at 104° F. for a period of two hours. Within the first hour a most vigorous reaction ensued, possessing twice the activity of same emulsion with 2% compressed baker's yeast. Stirring was necessary to prevent overflowing of the emulsion.

After the two-hour period, the emulsion was heated to a temperature of 145° F. and held at this temperature for ten minutes to inactivate the yeast. The emulsion failed to break when stirred.

Example 9

The emulsion consisting of 100 grams of commercial soybean phosphatide and 150 grams of water was prepared. The emulsion was homogenized and allowed to stand overnight.

To the emulsion was incorporated 2% of compressed baker's yeast based on the weight of soybean phosphatide. The yeast was first thoroughly mixed with a small volume of water.

The sample was held in the oven at 104° F. for a period of two hours. Within the first hour a most vigorous reaction occurred, requiring stirring to release the gas and prevent overflow of the emulsion. The beaker was not covered during the reaction.

After the two-hour period, the emulsion was brought to a temperature of 145° F. and held at this temperature for ten minutes to inactivate the yeast. Stirring did not cause the emulsion to break. The emulsion was heated under vacuum. During the first hour of heating, no distillate came over. The vacuum was broken frequently and the mass stirred. After the first hour slight water separation was noted. This was decanted and the drying continued. The product appears to possess a most unusual affinity for water as after being under vacuum for about several hours, but a small volume of the water has been removed.

Example 10

An emulsion was prepared consisting of 100 grams of soybean phosphatide and 150 grams of water. To the emulsion was incorporated 0.5 gram of compressed baker's yeast dispersed in a small volume of water. The emulsion was held in the air-oven at a temperature of 104° F. for a period of two hours with frequent stirring.

A mild reaction occurred during the first hour while a fairly vigorous reaction took place during the second hour.

The sample was dried under vacuum.

In the course of processing, the phosphatide material may be bleached with small amounts of peroxides.

In summarizing the above experiments, it has been found that the phosphatides or lecithin after the yeast treatment will reduce or prevent spattering to a higher degree when mixed with margarine and that highly stable emulsions are obtained by using these phosphatides, particularly with corn oil, aromatic solvents and the like.

Such emulsions have less tendency to form oil scum.

Even when the phosphatides are subsequently dehydrated, they show high or water miscible properties and although there does not seem to have been too drastic a change in the physical or chemical properties of the phosphatides or lecithin, nevertheless there has been a suprisingly great change in the polar characteristics or the hydrophilic-hydrophobic properties.

The compressed or similar types of baker's yeast which may be used according to the present invention may contain as much as 60 to 70% of water.

The yeast treatment may also be carried out after or in conjunction with a treatment of similar amounts of peroxidizing agents, such as perorganic acids and hydrogen peroxide. The preferred material for this purpose are small quantities of peracetic acid ranging from 2 to 5% of a 40% solution of peracetic acid.

The combined yeast and peroxidizing treatment gives less over-run and there is a great improvement in emulsifying properties of the phosphatides.

Preferably, the peroxidizing treatment takes place before the yeast treatment, although it may also take place after the yeast treatment has been completed and the yeast has been inactivated.

It is found that the yeast treatment also enables readier separation of the fat or oil from the phosphatides or commercial lecithin, and by permitting the yeast-treated phosphatides to stand overnight, particularly after they have also been peroxidized, the oil and fatty material will largely separate to the top and they may be separated by decantation or centrifuging.

The phosphatides may be bleached with small amounts of peroxides, such as hydrogen peroxide or sodium peroxide, either before or after the yeast treatment and if desired the peroxides may be added after incorporation of the yeast and before inactivation, providing that only small amounts, ranging between 2 to 5%, are incorporated.

The embodiment of the invention described herein is to be considered merely as illustrative, as the invention is susceptible to variation, modification and change within the spirit and scope of the appended claims.

Having now particularly described and ascertained the nature of the invention, and in what manner the same is to be performed, what is claimed is:

1. A process of modifying commercial phosphatides which comprises mixing such phosphatides with one to four times their weight of water, adding 2% of dried active yeast, heating for about two to four hours at 80 to 130° F.

2. A process of modifying commercial phosphatides which comprises mixing the phosphatides with 1½% of yeast and 0.1% of an ammonium salt and heating for two hours at a temperature of 120° F.

3. A process of improving vegetable phosphatides which comprises emulsifying such phosphatides in one to five times their weight of water, adding about 1 to 4% of compressed baker's yeast based upon the weight of the phosphatides, heating at 80 to 104° F. for two hours and thereafter heating for 30 minutes to two hours at about 145° F.

4. A process of improving vegetable phosphatides which comprises emulsifying such phosphatides in one to five times their weight of water, adding about 1 to 4% of compressed baker's yeast based upon the weight of the phosphatides, heating at 80 to 104° F. for two hours and thereafter heating for 30 minutes to two hours at about 145° F. and drying.

5. A process of improving vegetable phosphatides which comprises emulsifying such phosphatides in one to five times their weight of water, adding about 1 to 4% of live yeast based upon the weight of the phosphatides, heating at 80 to 104° F. for two hours and thereafter heating for 30 minutes to two hours at about 145° F.

6. A process of treating phosphatides to reduce spattering when mixed with margarine, to produce staple emulsions devoid of oil scum when emulsified with corn oil and aromatic solvents, with substantially modified polar characteristics and having high water miscible properties even when dehydrated, comprising treating the phosphatide with baker's yeast in the presence of water at 80 to 130° F. for two to four hours.

References Cited in the file of this patent

UNITED STATES PATENTS

| | | |
|---|---|---|
| 2,201,064 | Thurman | May 14, 1940 |
| 2,445,948 | Wittcoff | July 27, 1948 |
| 2,629,662 | Julian et al. | Feb. 24, 1953 |

OTHER REFERENCES

Sumner et al.: Enzymes, 1943, Academic Press, page 64. QP–601–S88, Div. 63.

Sumner et al.: The Enzymes, vol. 1, part 2, 1951, Academic Press, pages 996 and 997.

Markley: Soybean and Soybean Products, volume 2, pages 602, 606, 608.